(12) United States Patent
Lin (10) Patent No.: US 7,979,962 B2
(45) Date of Patent: Jul. 19, 2011

(54) HINGE MECHANISM WITH TWO ROTATION DIRECTIONS

(75) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 386 days.

(21) Appl. No.: 12/356,611

(22) Filed: Jan. 21, 2009

(65) Prior Publication Data

US 2010/0180402 A1 Jul. 22, 2010

(51) Int. Cl.
*E05D 3/10* (2006.01)

(52) U.S. Cl. ............... 16/367; 16/340; 16/334; 16/386

(58) Field of Classification Search ............ 16/367, 16/386, 338–340, 330, 303, 380; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| | | | | |
|---|---|---|---|---|
| 6,256,837 B1 * | 7/2001 | Lan et al. | | 16/334 |
| 7,017,235 B2 * | 3/2006 | Lu et al. | | 16/367 |
| 7,123,304 B2 | 10/2006 | Lu et al. | | 348/333.06 |
| 7,222,396 B2 * | 5/2007 | Lu et al. | | 16/340 |
| 7,380,313 B2 * | 6/2008 | Akiyama et al. | | 16/367 |
| 7,603,748 B2 * | 10/2009 | Hsu et al. | | 16/367 |
| 2005/0283949 A1 * | 12/2005 | Lu et al. | | 16/367 |
| 2008/0034549 A1 * | 2/2008 | Lee et al. | | 16/367 |
| 2008/0034550 A1 * | 2/2008 | Chang et al. | | 16/367 |
| 2008/0098566 A1 * | 5/2008 | Chiang et al. | | 16/277 |
| 2009/0121094 A1 * | 5/2009 | Chang et al. | | 248/125.7 |

* cited by examiner

*Primary Examiner* — Chuck Y. Mah
(74) *Attorney, Agent, or Firm* — Alan Kamrath; Kamrath & Associates PA (57) ABSTRACT

A hinge mechanism includes first and second hinge devices rotatable in different directions. Further, a first positioning member is utilized for limiting the rotation of the first hinge device within one predetermined angle. Further, a second positioning member is utilized for positioning the first pintle at various orientations. Moreover, a third positioning member is utilized for limiting rotation of the second hinge device within another predetermined angle. A fourth positioning member is utilized for positioning the second pintle at various orientations.

15 Claims, 12 Drawing Sheets

Fig.12

HINGE MECHANISM WITH TWO ROTATION DIRECTIONS

BACKGROUND OF THE INVENTION

1. Field of the Invention

The present invention relates to a hinge mechanism and, in particular, to a hinge mechanism with two rotation directions.

2. Description of the Related Art

U.S. Pat. No. 7,123,304 to Lu discloses a hinge for an LCD monitor of a video movie camera. The hinge has two ration directions such that the LCD monitor is pivotal in one of the directions to move between operational and stowed positions and is pivotal in the other direction to adjust viewing positions thereof.

Although it is claimed in Lu's hinge that the LCD monitor can be stably positioned at a desired position with respect to the video movie camera, it is still desirable to improve the positioning ability of the hinge and consider facilitating the assembling thereof and the cost of manufacturing thereof.

The present invention is, therefore, intended to obviate or at least alleviate the problems encountered in the prior art.

SUMMARY OF THE INVENTION

According to the present invention, a hinge mechanism includes first and second hinge device rotatable in different directions. The first hinge device includes a first pintle and first and second positioning members rotatable therewith. Further, a first stopping member is utilized for limiting the first positioning member in rotation between proximal and distal ends thereof. Accordingly, the rotation of the first pintle is limited between the proximal and distal ends of the first stopping member. The second positioning member is utilized for positioning the first pintle at various orientations. The second hinge device includes a second pintle and third and fourth positioning members rotatable therewith. Further, a second stopping member is utilized for limiting the third positioning member in rotation between proximal and distal ends thereof. Accordingly, the rotation of the second pintle is limited by the second stopping member. The fourth positioning member is utilized for positioning the second pintle at various orientations.

It is an objective of the present invention that the positioning abilities of the first and second pintles are improved.

It is a further objective of the present invention that the assembling is eased and the cost of manufacturing is effectively reduced.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

For the present disclosure to be easily understood and readily practiced, the present disclosure will now be described in conjunction with the following figures, wherein.

DETAILED DESCRIPTION OF THE PREFERRED EMBODIMENT

FIGS. 1 through 4 show a hinge mechanism includes first and second hinge devices 20 and 40, with the first hinge device 20 rotatable about one directional axis and the second hinge device 40 rotatable about another directional axis.

Figure 1:
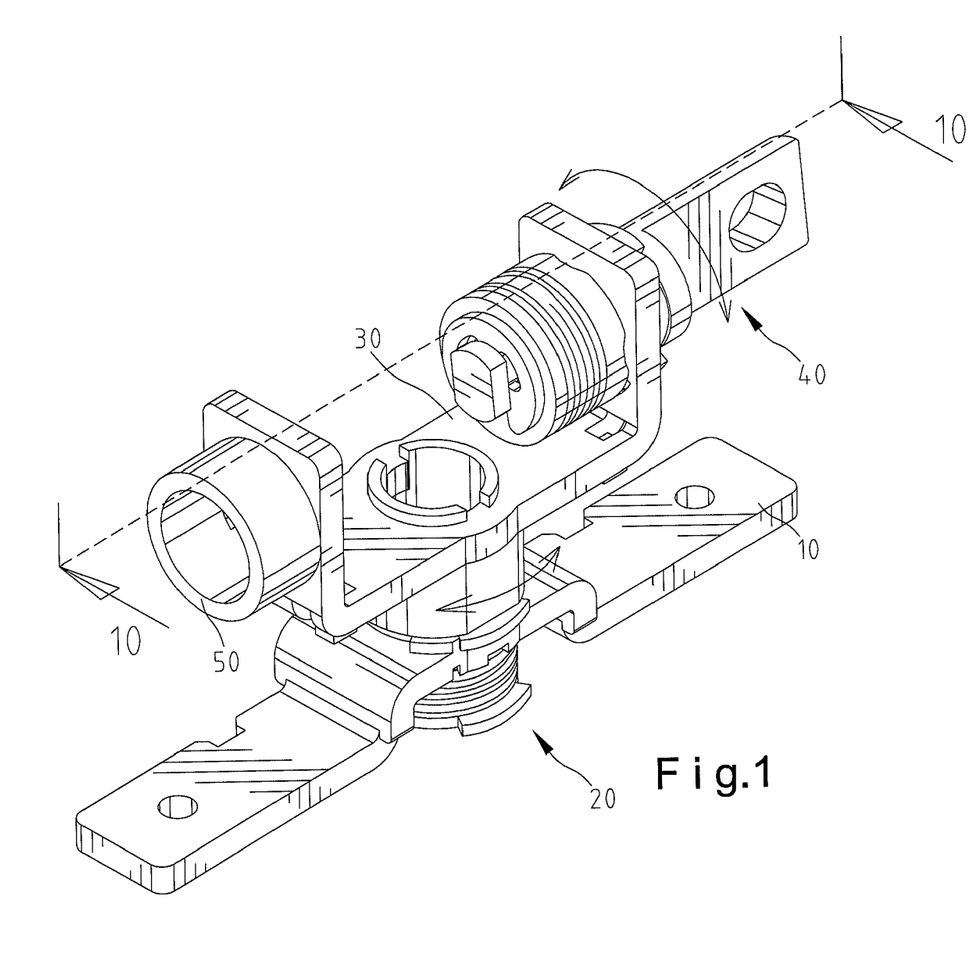
FIG. 1 is a perspective view of a hinge mechanism in accordance with a first embodiment of the present invention.
Figure 2:
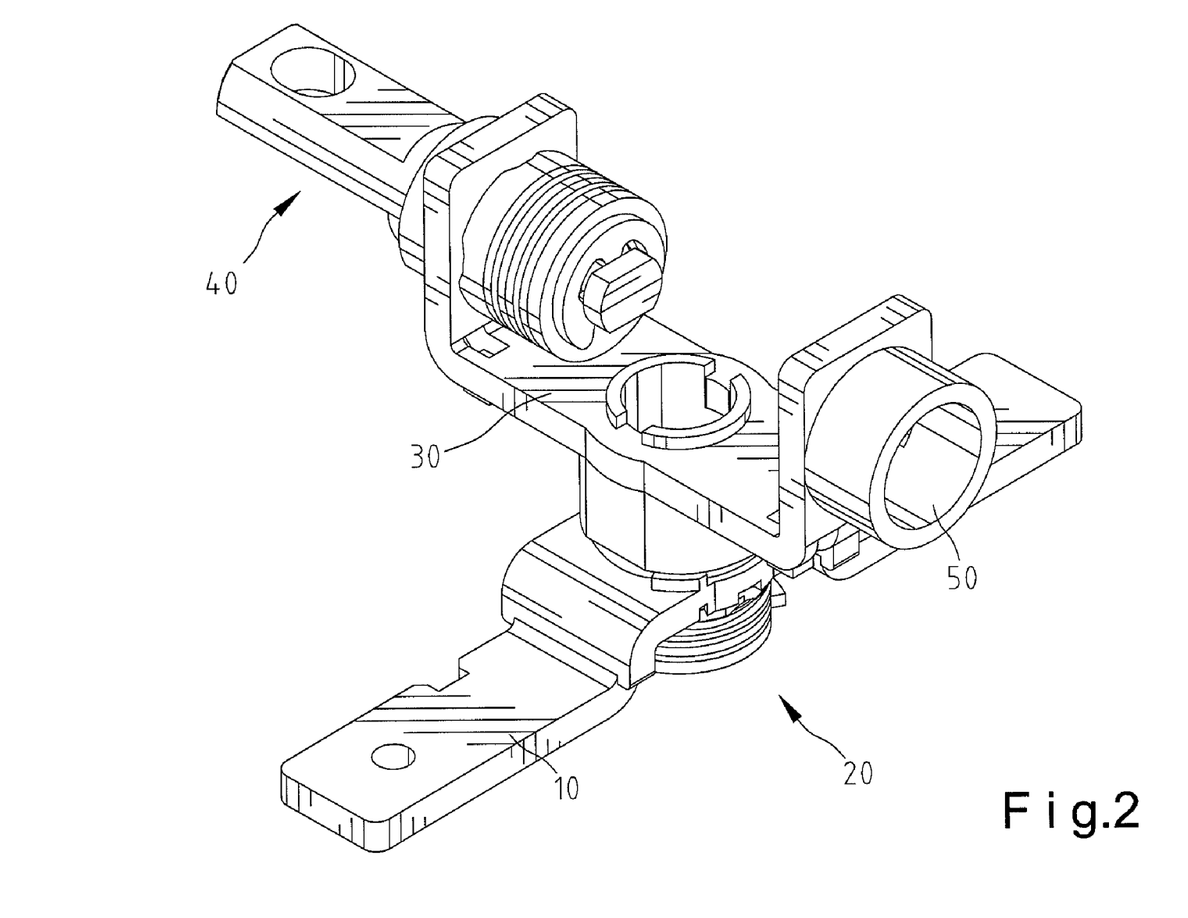
FIG. 2 is an extended perspective view of FIG. 1 and shows first and second hinge device of the hinge mechanism in another position.
Figure 3:
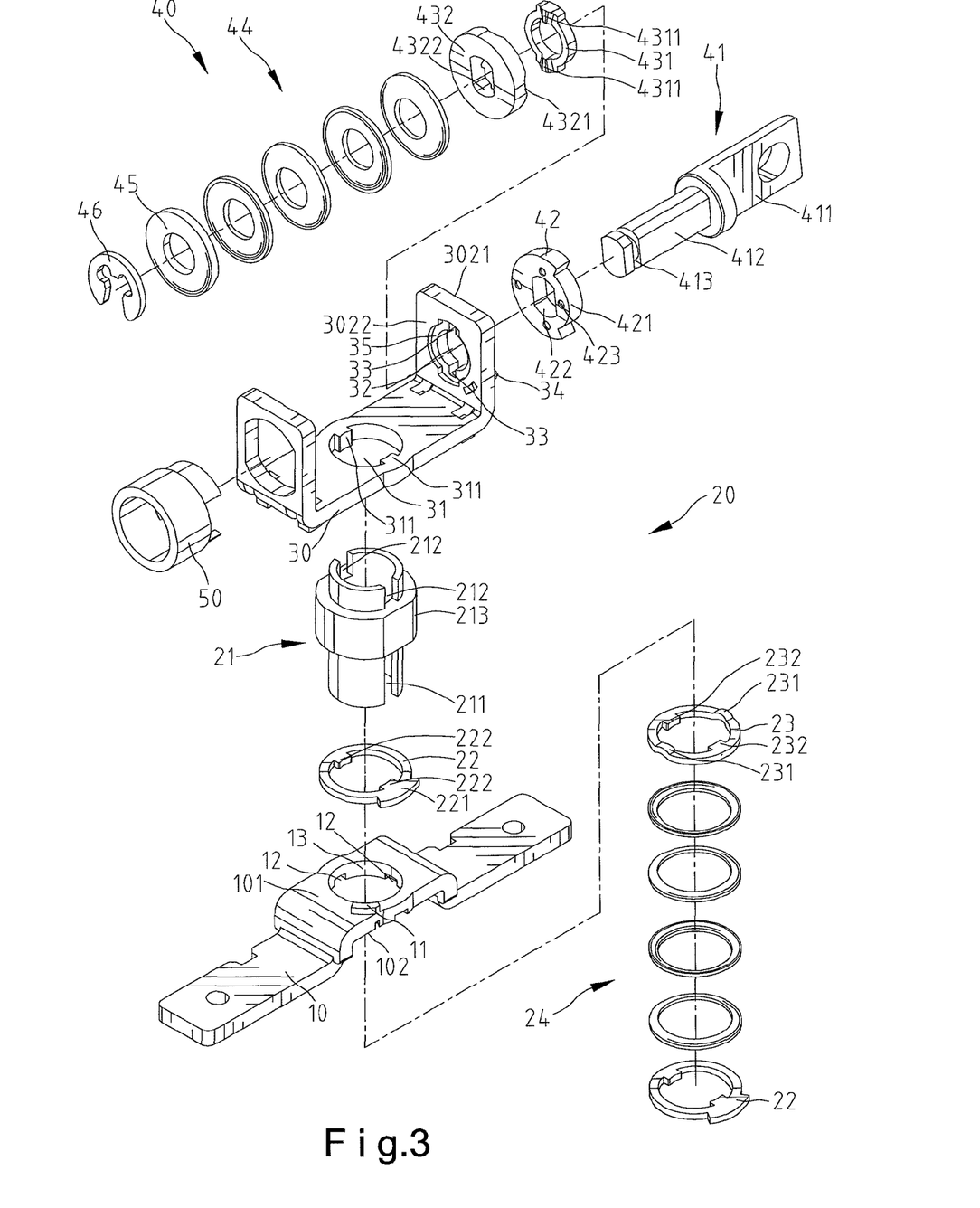
FIG. 3 is an exploded perspective view of the hinge mechanism shown in FIG. 1.

As best shown in FIGS. 2 and 3, the first hinge device 20 includes a first pintle 21 rotatably installed on a first supporting frame 10 which is adapted to be installed on a base of an electronic device. Particularly, the first pintle 21 has a first end rotatably installed in a first hole 13 which extends through the first supporting frame 10. The first hinge device 10 further includes first and second positioning members 22 and 23. The first positioning member 22 is installed on the first pintle 21 and is rotatable with the first pintle 21. In this preferred embodiment, the first pintle 21 includes a first gap 211 at the first end thereof, and the first positioning member 22 is in the form of a ring and includes a first hook 222 protruding inward from the inner periphery and engaged in the first gap 211 to accomplish engagement therebetween.

FIGS. 2 and 3 also show the number of first gap 211 is two and the two first gaps 211 are diametrically opposite to each other. Similarly, the number of the first hook 222 is two and the two first hooks 222 are diametrically opposite to each other.

The first supporting frame 10 includes a first stopping member 11 disposed on a first side 101 thereof for limiting the rotation of the first positioning member 22 between proximal and distal ends of the first stopping member 11. Accordingly, the rotation of the first pintle 21 is limited between the proximal and distal ends of the first stopping member 11, i.e. the first pintle 21 has a predetermined angle of rotation less than 360 degrees and this design prevents wires adapted to be disposed in the first pintle 21 from being twisted. In this preferred embodiment, the first positioning member 22 includes an abutting portion 211 protruding outward from the outer periphery and the rotation of the abutting portion 211 is limited by the first stopping member 11.

The second positioning member 23 is installed on the first pintle 21 and is rotatable with the first pintle 21 as well. In this preferred embodiment, the second positioning member 23 is in the form of a ring and includes a second hook 232 protruding inward from the inner periphery and engaged in the first gap 211 to accomplish engagement therebetween. As shown in FIGS. 2 and 3, the number of second hook 232 is two and the two second hooks 232 are diametrically opposite to each other.

Additionally, the second positioning member 23 includes a first engaging portion 231 and the first supporting frame 10 includes a plurality of first positioning sections 12, and the first engaging portion 231 is engagable with one of the plurality of first positioning sections 12 for positioning the first pintle 21 at various orientations. In this preferred embodiment, the plurality of first engaging sections 12 are disposed on a second side 102 of the first supporting frame 10 and are spaced from one another and are disposed circumferentially about the first hole 13. The first engaging portion 2331 protrudes upward from the second positioning member 23. Each of the plurality of first positioning sections 12 is in the form of a recess inset on the second side 102 for receiving the engaging portion 231. Also, the number of engaging portion 231 is two and the two engaging portions 231 are diametrically opposite to each other, and the plurality of first positioning sections 12 includes two of which that are diametrically opposite to each other and are engaged by the two engaging portions 231 at a time.

FIG. 2 also shows the proximal and distal ends of the first stopping member 11 are away from each other at a first distance and one of the plurality of first positioning sections 12 is away from the other of the plurality of first positioning sections 12 at a second distance greater than the first distance.

A plurality of first resilient members 24 are installed coaxially on the first pintle 21 to bias the first engaging portion 231 of the second positioning member 23 to engage with one of the plurality first positioning sections 12. Preferably, each of the plurality of first resilient members 24 is in the form of a ring.

A second supporting frame 30 is rotatably installed on a second end of the first pintle 21. In this preferred embodiment, the second supporting frame 30 includes a second hole 31 engaged with the second end of the first pintle 21. Additionally, the first pintle 21 includes a second gap 212, and the second hole 31 includes a third hook 311 protruding inward from the second hole 31 and engaged in the second gap 212 to accomplish engagement therebetween.

Similarly, the number of second gap 212 is two and the two second gaps 212 are diametrically opposite to each other.

Preferably, one of the second gaps 212 is coaxial with one of the first gaps 211, and the other of the second gaps 212 is coaxial with the other of the first gaps 211.

The second supporting frame 30 includes first and second lateral sides parallel to each other. The first lateral side includes first and second walls 3021 and 3022 opposite to each other. Additionally, the first and second supporting frames 10 and 30 are securely spaced by a flange 213 disposed on the first pintle 41. In this preferred embodiment, the cross section of the flange 213 is greater than those of the first and second holes 13 and 31 to accomplish secure spaced relationship between the first and second supporting frames 10 and 30.

Figure 4:
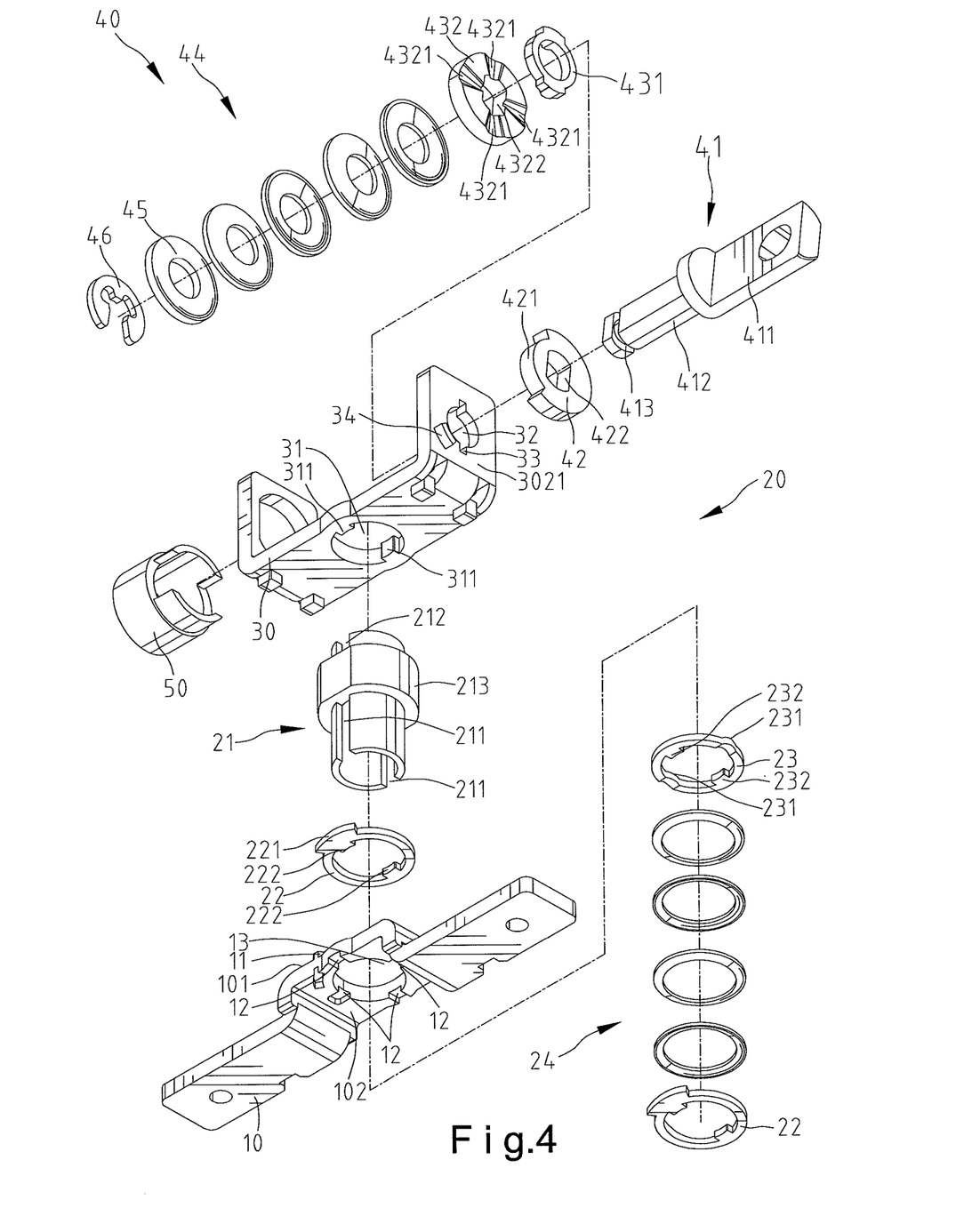
FIG. 4 is another exploded perspective view of the hinge mechanism shown in FIG. 1.
Figure 5:
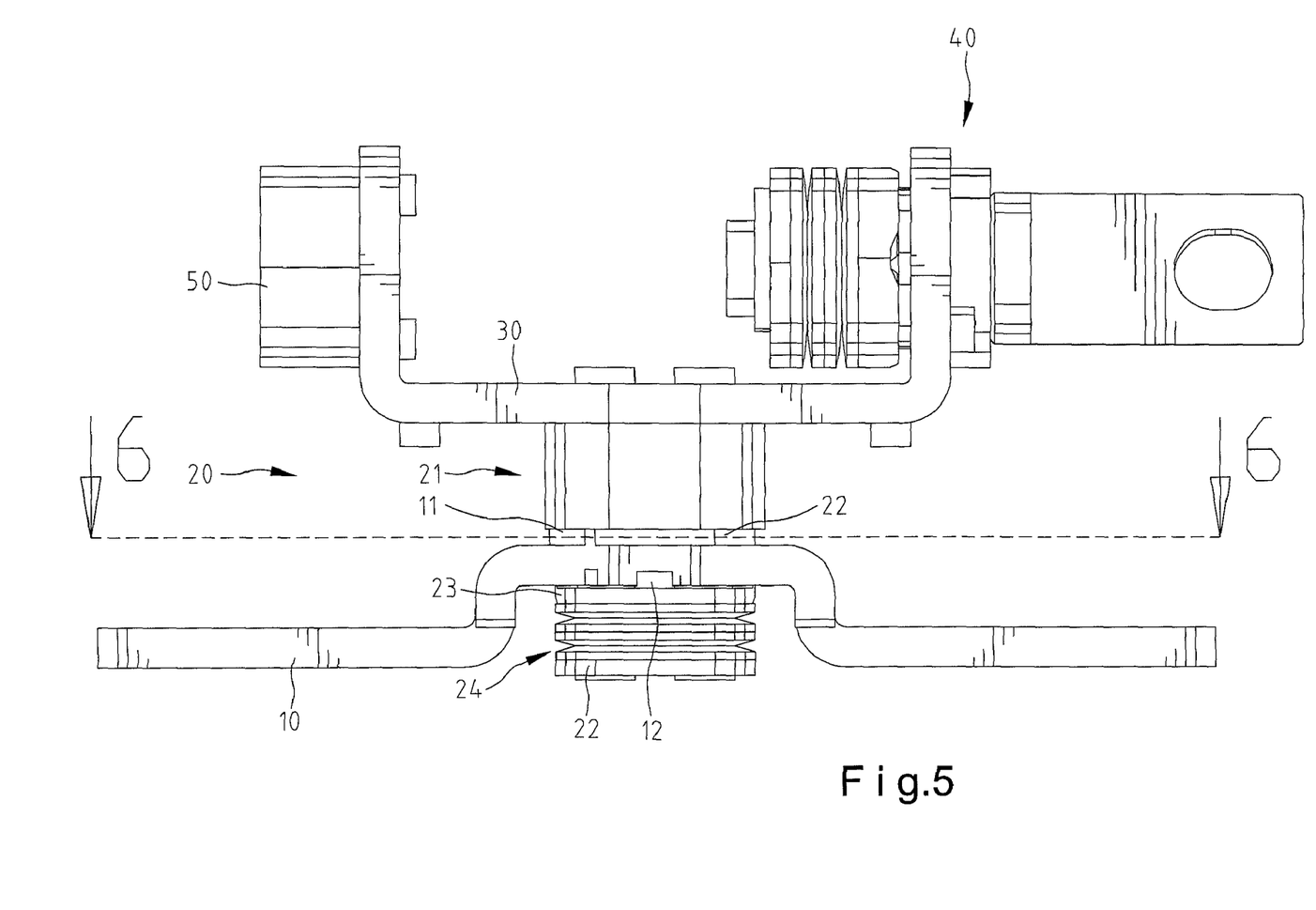
FIG. 5 is a front elevation view of the hinge mechanism shown in FIG. 1.
Figure 6:
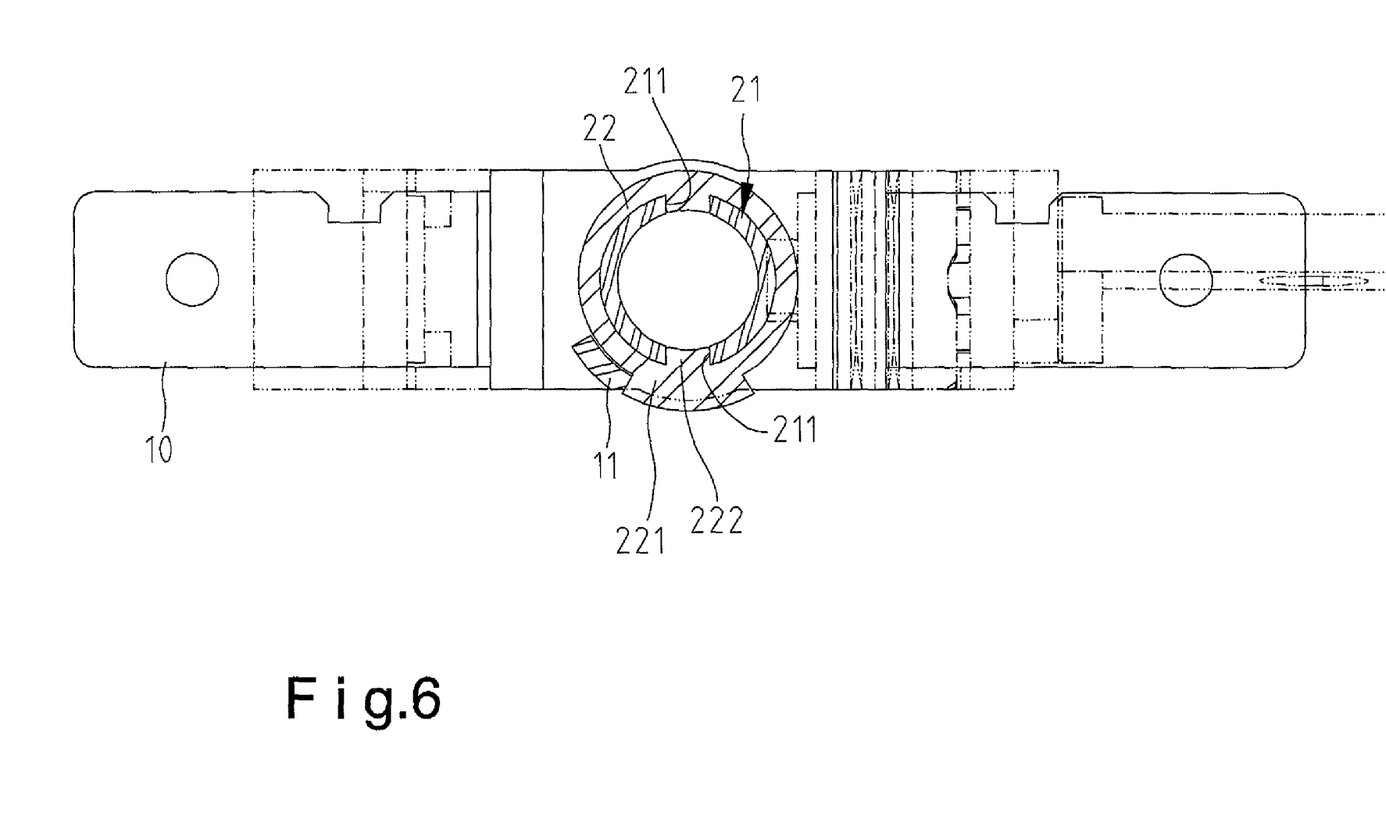
FIG. 6 is a cross-sectional view taken along line 6-6 of FIG. 5.
Figure 7:
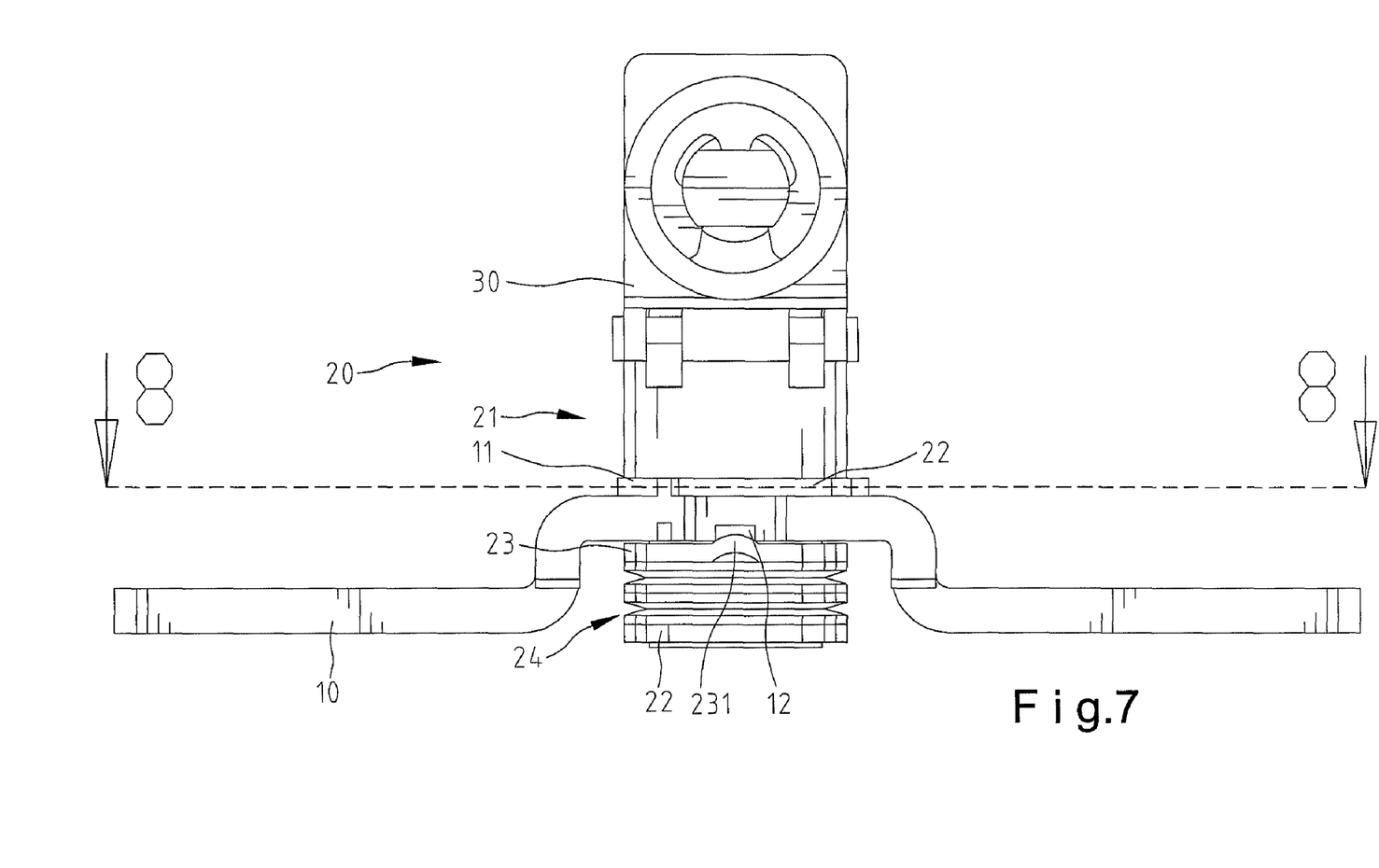
FIG. 7 is a side view of the hinge mechanism shown in FIG. 2.
Figure 8:
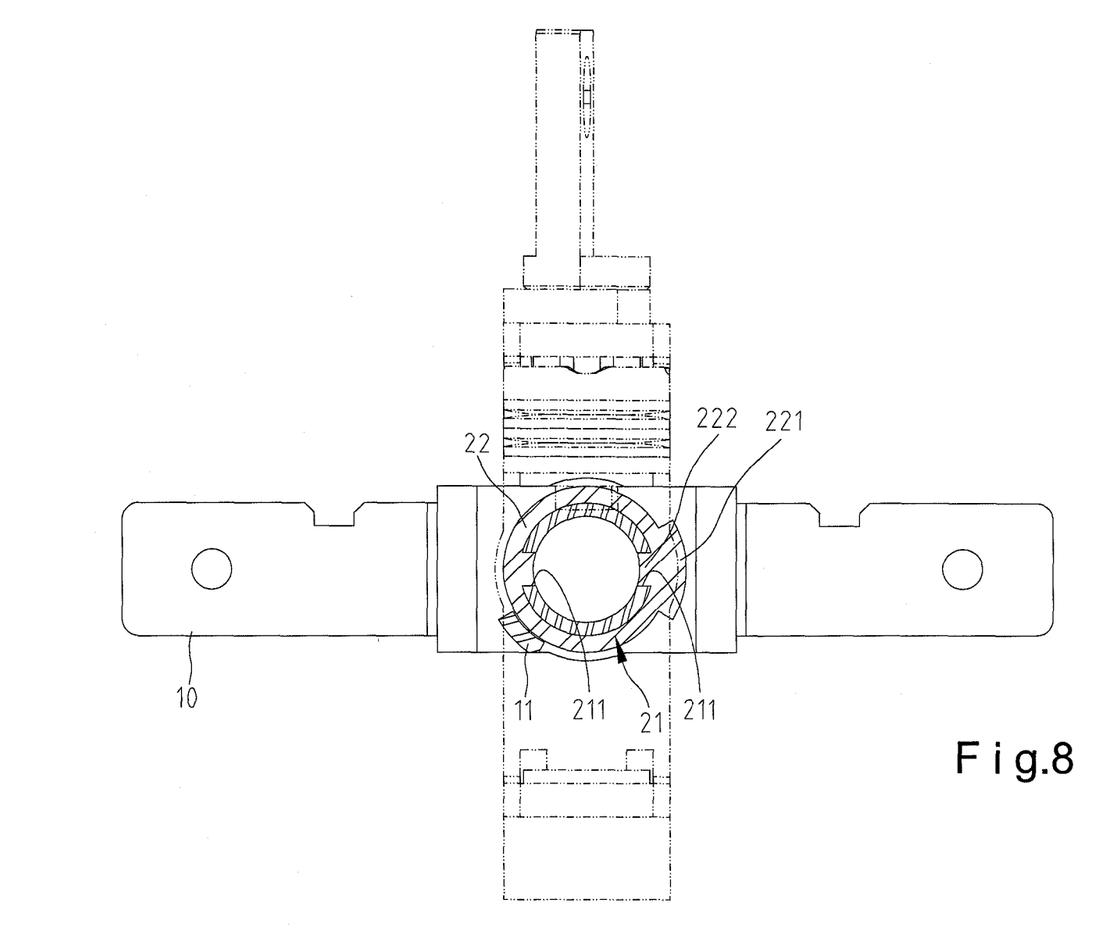
FIG. 8 is a cross-sectional view taken along line 8-8 of FIG. 7.
Figure 9:
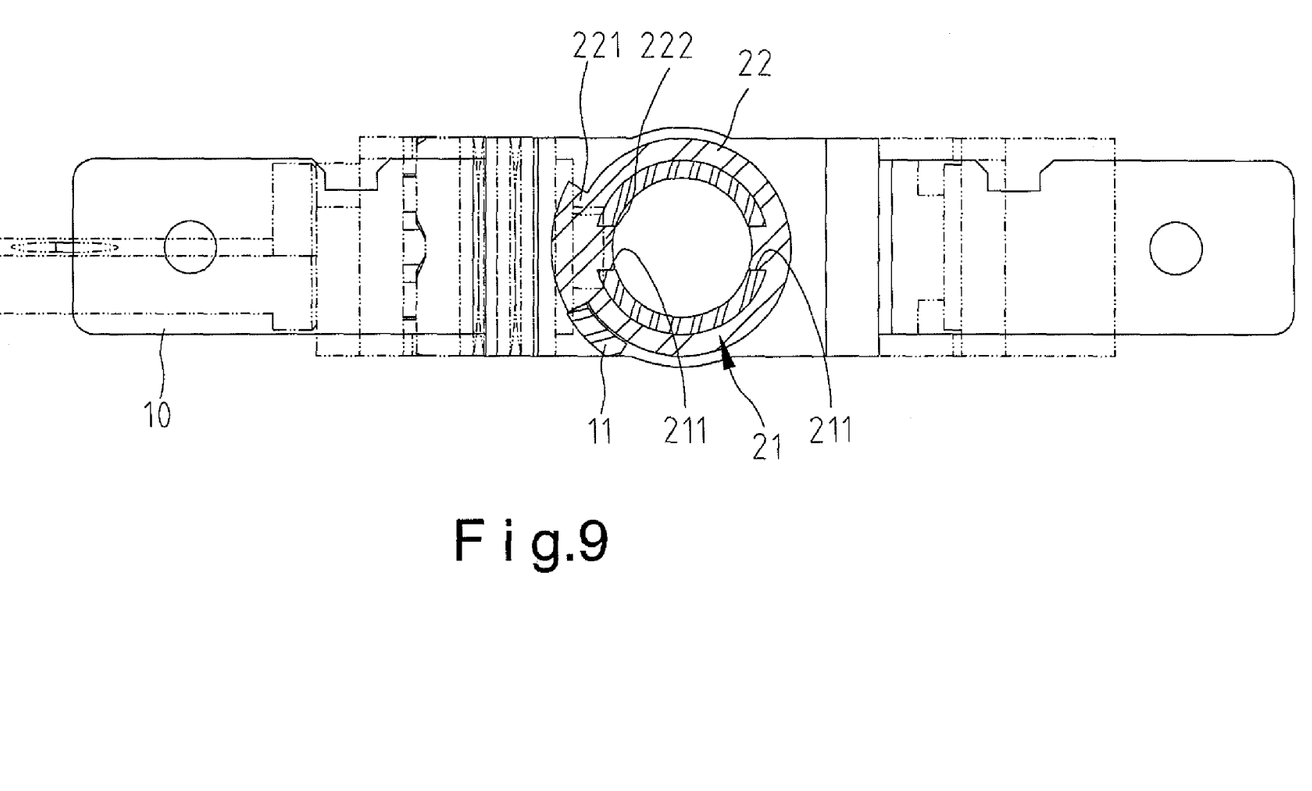
FIG. 9 is a cross-sectional view similar to FIG. 8 and shows the first hinge device of the hinge mechanism in another position.
Figure 10:
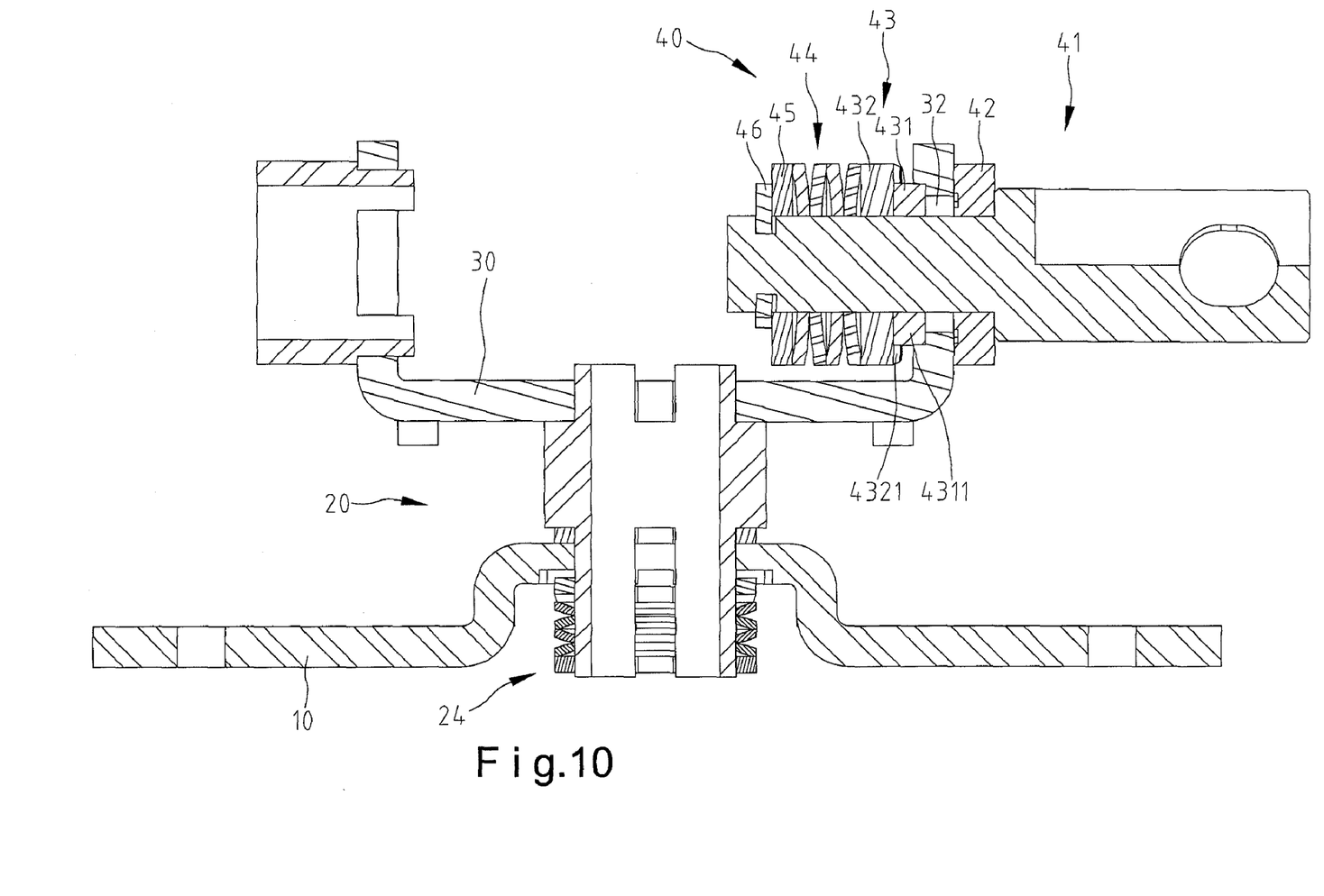
FIG. 10 is a cross-sectional view taken along line 10-10 of FIG. 1.

The second hinge device 40 includes a second pintle 41 with a first end 411 and a second end 412 rotatably installed in a third hole 32. The third hole 32 extends through the first lateral side of the second supporting frame 30. Preferably, the first end 411 is adapted to be installed on a monitor of the electronic device. The second hinge device 40 further includes third and fourth positioning members 42 and 432. The third positioning member 42 is installed on the second end 412 of the second pintle 41 and is rotatable with the second pintle 41. In this preferred embodiment, the second end 412 of the second pintle 41 has a non-circular cross section, and the third positioning member 42 has a through hole 422 with the same cross section for receiving the second end 412 of the second pintle 41 and for rotation with the second pintle 41.

The second supporting frame 30 also includes a second stopping member 34 disposed on the first wall 3021 and the third positioning member 42 includes an engaging groove 421 with two closing ends selectively abutted by the second stopping member 34. Thus, the rotation of the third positioning member 42 is limited between proximal and distal ends of the second stopping member 34. Accordingly, the rotation of the second pintle 41 is limited between proximal and distal ends of the second stopping member 34.

The fourth positioning member 432 is installed on the second pintle 41 and is rotatable with the second pintle 41 as well. Additionally, the fourth positioning member 432 includes a second engaging portion 4321 and a fifth positioning member 431 including a plurality of second positioning sections 4311 engagable with the second engaging portion 4321 for positioning the second pintle 41 at various orientations.

The fifth positioning member 431 is tightly received in a recess 35 inset on the second wall 3022 of the first lateral side of the second supporting frame 30. The recess 35 is coaxial with the third hole 32 and has a cross section greater than that of the third hole 32. Further, a cutout 33 is utilized to allow a tool to easily dismount the fifth positioning member 431 from the recess 35 when the fifth positioning member 431 is to be maintained or changed for a replacement. However, it is understood that the plurality of second position sections 4311 would be integrally formed on the second wall 3022 of the first lateral side of the second supporting frame 30.

Similarly, a plurality of second resilient members 44 are installed coaxially on the second end 412 of the second pintle 41 to bias the second engaging portion 4321 of the fourth positioning member 432 to engage with one of the plurality of second positioning sections 4311. Preferably, each of the plurality of second resilient members 44 is in the form of a ring.

Moreover, the third positioning member 43 includes a plurality of lubrication reserving recesses 423 to facilitate the rotation on the first wall 3021 of the first lateral side of the second supporting frame 30. The second pintle 41 includes a notch 413 at the second end 412 thereof for receiving a clip 46. The clip is utilized to retain the fourth positioning member 432 and the plurality of second resilient members 44 on the second pintle 41. A spacer 45 is utilized between the plurality of second resilient members 44 and the clip 46 for reducing friction therebetween. A fastening member 50 is installed on the second lateral side of the second supporting frame 30 for securing another equipment of the electronic device.

Based on the forgoing, the first hinge device 20 is positionable at three orientations, as best shown from FIGS. 5 to 10.

Figure 11:
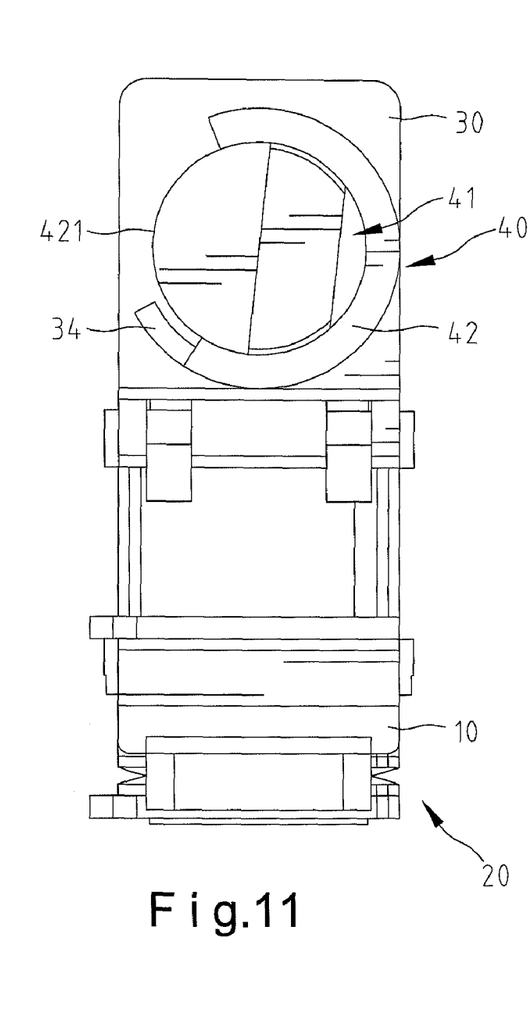
FIG. 11 is a right elevation view of the hinge mechanism shown in FIG. 1.
Figure 12:
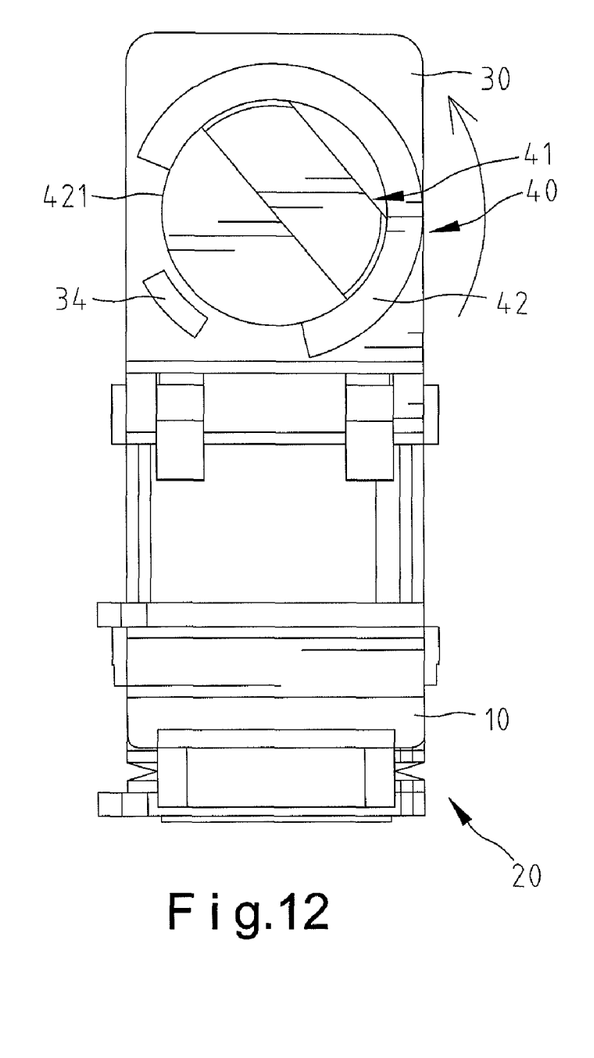
FIG. 12 is an extended view of FIG. 11 and shows the second hinge device in another position.

FIGS. 11 and 12 show the second hinge device 40 is rotatable with a second supporting frame 30.

While the specific embodiments have been illustrated and described, numerous modifications come to mind without significantly departing from the spirit of invention and the scope of invention is only limited by the scope of accompanying claims.

What is claimed is:

1. A hinge mechanism comprising:
a first supporting frame including first and second sides opposite to each other, a first stopping member disposed on one of the first and second sides, a plurality of first positioning sections disposed on the other of the first and second sides, and a first hole extending through the first and second sides;

a first hinge device including a first pintle rotatably installed on the first supporting frame, with the first pintle including a first end and a second end extending through the first hole, a first positioning member installed on the first pintle and rotatable with the first pintle, with the rotation of first positioning member limited between proximal and distal ends of the first stopping member, a second positioning member installed on the first pintle and rotatable with the first pintle, with the second positioning member including a first engaging portion engagable with one of the plurality of first positioning sections for positioning the first pintle at various orientations, and a plurality of first resilient members installed coaxially on the first pintle, with the plurality of first resilient members biasing the first engaging portion of the second positioning member to engage with one of the plurality of first positioning sections;

a second supporting frame including a second hole engaged with the second end of the first pintle and including first and second lateral sides parallel to each other, with the first lateral side including first and second walls opposite to each other, a second stopping member disposed on one of the first and second walls, a plurality of second positioning sections disposed on the other of the first and second walls, and a third hole extending through the first and second walls; and a second hinge device including a second pintle rotatably installed on the first lateral side of the second supporting frame, with the second pintle including a first end and a second end extending through the third hole, a third positioning member installed on the second pintle and rotatable with the second pintle, with the rotation of the third positioning member limited between proximal and distal ends of the second stopping member, a fourth positioning member installed on the second pintle and rotatable with the second pintle, with the fourth positioning member including a second engaging portion engagable with one of the plurality of second positioning sections for positioning the second pintle at various orientations, and a plurality of second resilient members installed coaxially on the second pintle, with the second resilient members biasing the second engaging portion of the fourth positioning member to engage with one of the plurality of second positioning sections.

2. The hinge mechanism as claimed in claim 1 wherein the first pintle includes a flange spacing the first and second supporting frames, and wherein the flange includes a first cross section, the first hole includes a second cross section and the second hole includes a third cross section respectively, and with the first cross section greater than the second and third cross sections.

3. The hinge mechanism as claimed in claim 1 wherein the first pintle includes at least one first gap at the first end thereof, and wherein the first positioning member includes at least one first hook engaged in the first gap, and wherein the second positioning member includes at least one second hook engaged in the first gap.

4. The hinge mechanism as claimed in claim 3 wherein the first pintle includes at least on second gap at the second end thereof, and wherein the second hole includes a third hook engaged in the second gap.

5. The hinge mechanism as claimed in claim 4 wherein the first gap is coaxial with the second gap.

6. The hinge mechanism as claimed in claim 4 wherein the number of first gap is two and the two first gaps are diametrically opposite to each other, and wherein the number of second gap is two and the second gaps are diametrically opposite to each other, and wherein one of the first gaps is coaxial with one of the second gaps the other of the first gaps is coaxial with the other of the second gaps.

7. The hinge mechanism as claimed in claim 6 wherein the number of first hook is two and the two first hooks are diametrically opposite to each, and wherein the number of second hook is two and the two second hooks are diametrically opposite to each other.

8. The hinge mechanism as claimed in claim 3 wherein the first positioning member is in the form of a ring and includes a first outer periphery and a first inner periphery, and an abutting portion protruding outward from the first outer periphery, and with rotation of the abutting portion limited by the first stopping member.

9. The hinge mechanism as claimed in claim 8 wherein the first hook protrudes inward from the first inner periphery.

10. The hinge mechanism as claimed in claim 3 wherein the second positioning member is in the form of a ring, and wherein the first engaging portion protrudes upward therefrom, and wherein each of the plurality of first positioning sections is in the form of a recess inset on the second side of the first supporting frame.

11. The hinge mechanism as claimed in claim 10 wherein the plurality of first positioning sections are spaced from one another and are disposed circumferentially about the first hole.

12. The hinge mechanism as claimed in claim 11 wherein the plurality of first positioning sections include two of which that are diametrically opposite to each other, and wherein the proximal and distal ends of first stopping member are away from each other at a first distance and one of the plurality of first positioning sections is away from the other of the plurality of first positioning sections at a second distance, with the second distance greater than the first distance.

13. The hinge mechanism as claimed in claim 1 wherein the third positioning member includes a plurality of lubrication reserving recesses to facilitate the rotation on the first wall of the first lateral side of the second supporting frame.

14. The hinge mechanism as claimed in claim 1, further comprising a fifth positioning member, the plurality of second positioning sections is formed on a side of said fifth positioning member, and wherein said second supporting frame includes a recess inset on the second wall of the first lateral side and coaxial with the third hole, and wherein the fifth positioning member is received in the recess.

15. The hinge mechanism as claimed in claim 1 wherein each of the plurality of first resilient members is in the form of a ring and each of the plurality of second resilient members is in the form of a ring.

* * * * *